Sept. 1, 1931.  E. B. BOUGHTON ET AL  1,821,419
HYDRAULIC BRAKE FOR AEROPLANES
Filed Feb. 27, 1930   3 Sheets-Sheet 1
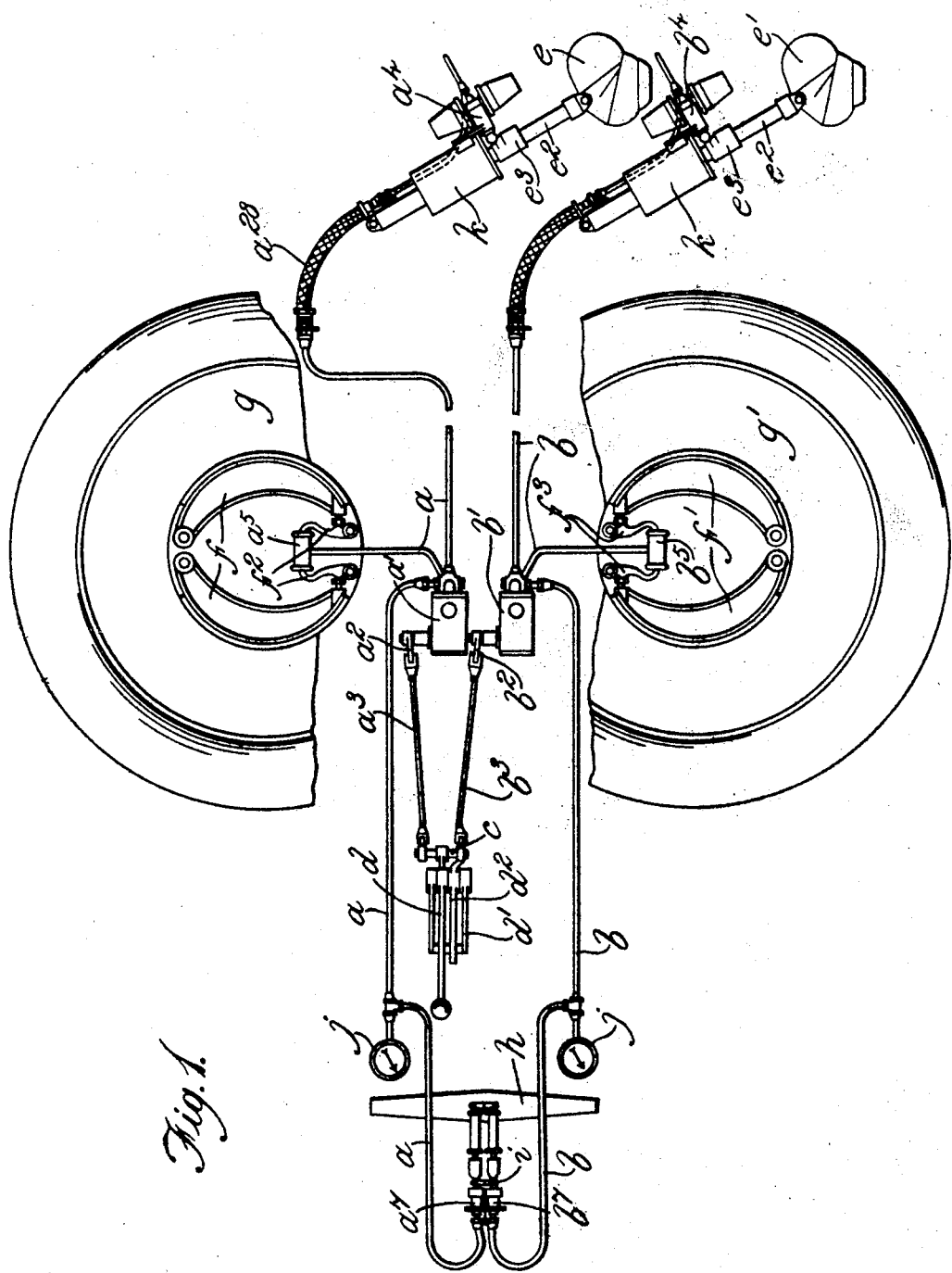

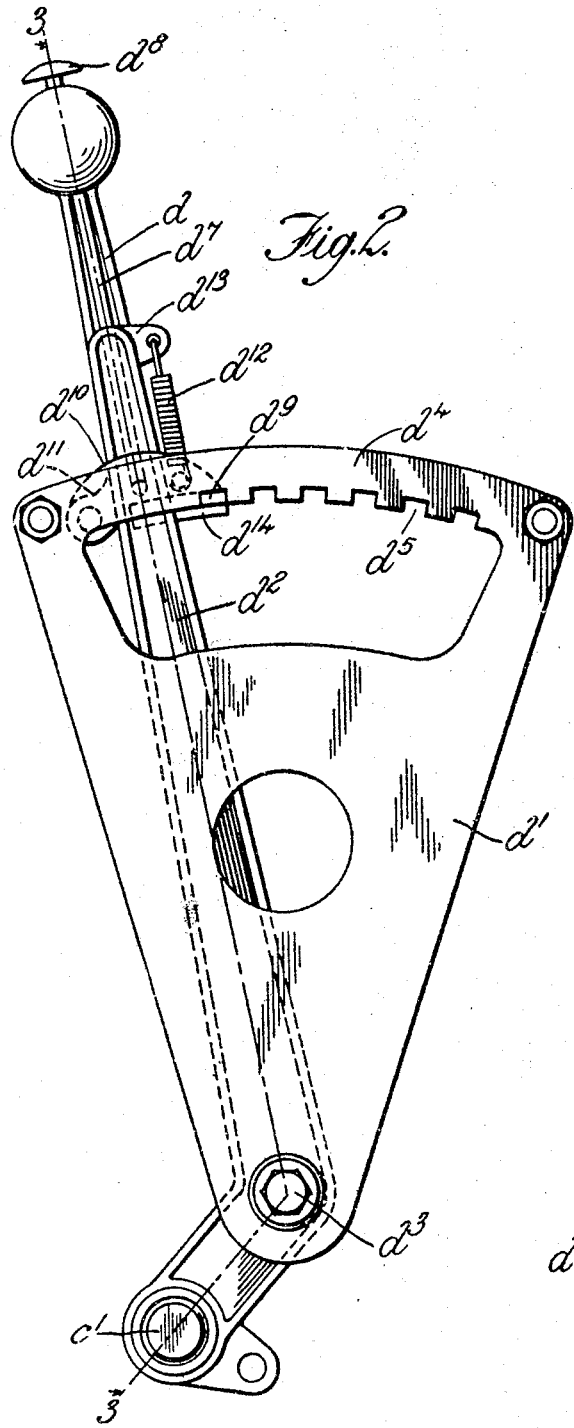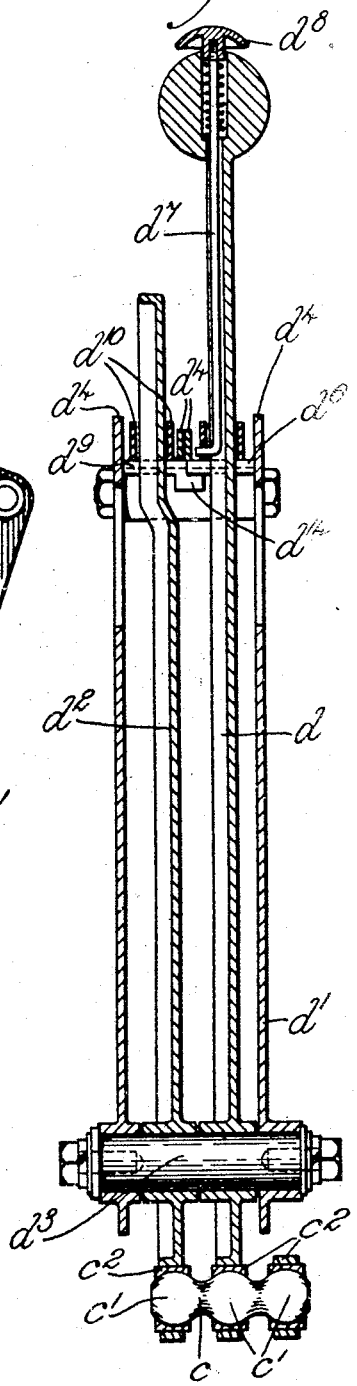

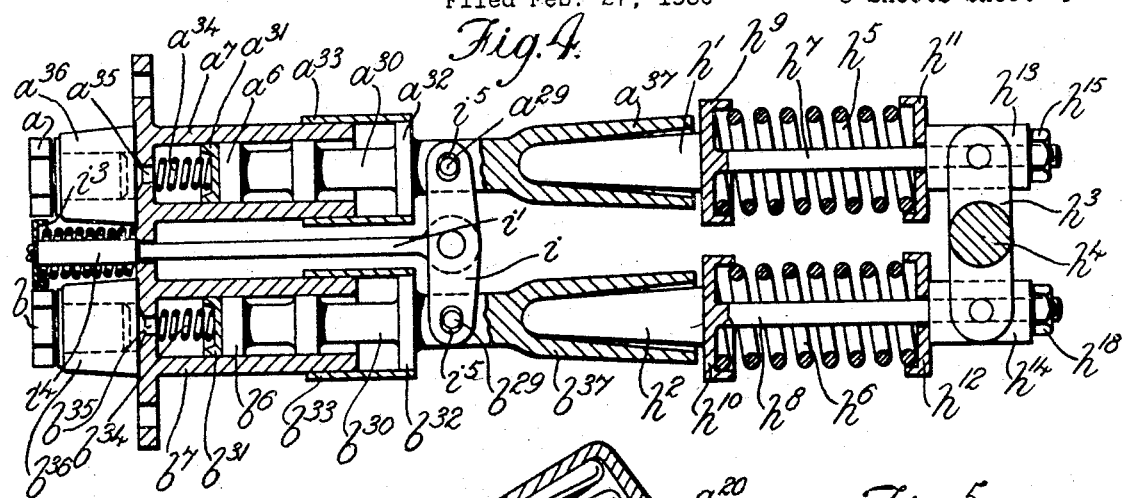
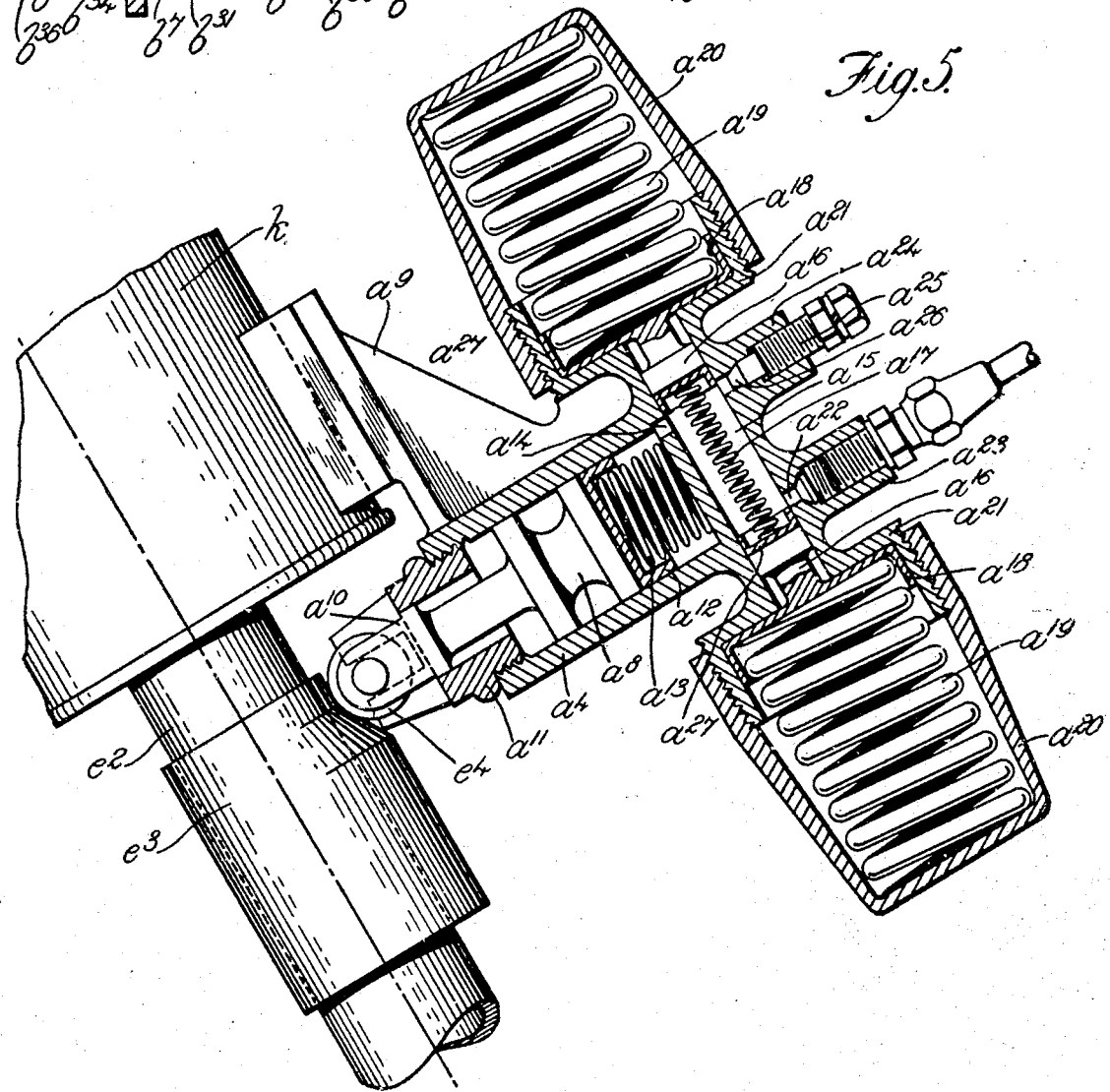

Patented Sept. 1, 1931

1,821,419

UNITED STATES PATENT OFFICE

EDWARD BISHOP BOUGHTON, WILLIE EMMOTT, DENIS TABOR BROCK, AND AUSTIN CUTHBERT BURDON, OF LONDON, ENGLAND

HYDRAULIC BRAKE FOR AEROPLANES

Application filed February 27, 1930, Serial No. 431,950, and in Great Britain March 5, 1929.

This invention relates to hydraulic brakes for aeroplanes, of the kind described in the prior British specification No. 296,798, and comprising two separate hydraulic braking systems each of which is connected to the brakes of the landing wheel or wheels at one side of the centre line of the machine, and comprises a master piston and cylinder or equivalent device by which all play in the braking system is initially taken up and by which the degree of braking may be adjusted, and a pressure-producing piston and cylinder arranged to be operated by the tail-supporting skid or member to produce a braking pressure in proportion to or dependent upon the weight supported by the skid or member when the machine is running upon the ground, the two systems being interconnected by controlling means in such manner that the pressure in one system may be increased with a corresponding decrease of pressure in the other system for the purpose of steering. In the prior arrangement the means for varying the pressures in the two systems comprises lever mechanism associated with the master pistons.

The present invention has for its object to provide an improved braking system of the kind referred to whereby the variation in pressures in the two systems for the purpose of steering may be effected by means independent of the master pistons by which play in the systems is initially taken up and by which the pressures in the systems are initially equalized or balanced.

According to the invention, each of the two systems comprises in addition an auxiliary pressure-adjusting piston and cylinder, and the auxiliary pressure-adjusting pistons of the two systems are interconnected by a compensating lever or the equivalent by or through which they may be operated to increase the pressure in one of the systems and to permit a corresponding decrease of pressure in the other system, so as to effect steering of the aeroplane in one direction or the other as required. The pressure-producing pistons of the respective systems may be operated by a single tail skid or member or by separate tail skids or members supporting the rear part of the machine, and the pressure-adjusting pistons conveniently are operated by the usual foot rudder bar or other steering member. Pressure-limiting springs may be interposed between the steering member and the respective pressure-adjusting pistons, and in order to obviate excessive pressure in the systems, suitable pressure-limiting pistons under the control of springs may be associated with the pressure-producing cylinders.

The master pistons and cylinders referred to are preferably arranged at the highest point in the system for the purpose of facilitating the filling of the system with the operating fluid, such as water or oil, and the various pipe connections leading from the master cylinders to the other operative parts of the systems are preferably arranged so as to have a continuous downward inclination from the said master cylinders. The master pistons are operated by a common hand lever through a compensating lever or bar ensuring that in the initial setting of the brakes by the hand lever to take up all play and to determine or to adjust the degree of braking pressure, the pressure in the two systems shall be equal. It is necessary that when the brakes have been set by the operation of the hand lever, the compensating bar or lever associated therewith should be locked to render the two systems independent one of the other except in so far as they are under the control of the steering bar or member through the pressure-adjusting pistons and cylinders before referred to. For this purpose, the compensating bar or lever to the middle point of which the hand lever is connected, is also connected at one end or at one side of the middle point thereof to an auxiliary lever which is adapted to lock or to be locked in the position to which it has been moved in consequence of the setting movement of the hand lever. Conveniently, each system is provided with a pressure gauge by which the initial pressure produced by the hand lever is indicated.

The invention is hereinafter described by way of example with reference to the accompanying diagrammatic drawings, in which:—

Figure 1 is a diagrammatic view illustrating the improved braking system according to the invention;

Figure 2 is a view in side elevation illustrating the hand lever brake-setting device;

Figure 3 is a section on the line 3—3, Figure 2;

Figure 4 is a sectional plan view of the pressure-adjusting devices and the operating gear associated therewith; and Figure 5 is a sectional elevation illustrating one of the pressure-producing devices.

In carrying the invention into effect according to one embodiment of the invention by way of example to the application of the invention to an aeroplane having a pair of landing wheels and a pair of tail-supporting skids, and with reference to the accompanying diagrammatic drawings, the improved braking system according to the invention comprises a pair of separate systems $a$, $b$ each consisting of a master pressure-controlling device $a'$, $b'$ preferably arranged at the highest point in the respective system and having its operating lever $a^2$, $b^2$ connected by means of a suitable rod $a^3$, $b^3$ to a compensating bar or lever $c$ pivoted at a middle position to the lower end of a hand or other lever $d$ mounted in a suitable position for operation by the pilot, a pressure-producing device $a^4$, $b^4$ associated with and operated by the movement of the respective tail skid $e$, $e'$ in proportion to or dependent upon the pressure with which the latter is applied to the ground by the weight of the machine, a brake-operating cylinder $a^5$, $b^5$ and piston or pistons associated with the brake shoes $f$, $f'$ of the respective landing wheel $g$, $g'$, and a pressure-adjusting piston $a^6$, $b^6$ (Figure 4) and cylinder $a^7$, $b^7$ adapted to be operated by the rudder bar $h$ or other suitable means, the two pressure-adjusting cylinders $a^7$, $b^7$ being interconnected by means of a compensating bar or lever $i$ so that the operation of one piston to increase the pressure in the respective system is attended by movement of the other piston in the reverse direction to permit a corresponding decrease of pressure in the other system. The pressure-producing device $a^4$, $b^4$, the brake-operating device $a^5$, $b^5$ and the pressure-adjusting device $a^7$, $b^7$ are connected to the master cylinder $a'$, $b'$ by pipe lines $a$, $b$, preferably arranged to have a continuous downward slope from the master cylinders, flexible couplings or pipe sections being provided to allow for the relative movement between the tail skids and wheels of the aeroplane when landing and running upon the ground. A pressure gauge $j$, $j'$ is inserted into or connected to the line between the master cylinder $a'$, $b'$ and the respective pressure-adjusting cylinder $a^7$, $b^7$ for the purpose of indicating the pressure to which the brakes are initially set when taking up the play in the system.

The master devices $a'$, $b'$ preferably are constructed in accordance with the prior British specification No. 283,045 so as to make up automatically any deficiency in the amount of the pressure fluid in the respective system. The hand lever $d$ by which the master devices $a'$, $b'$ are operated to take up play in the respective systems is mounted in a suitable quadrant $d'$ adapted also for the reception of an auxiliary compensating bar locking lever $d^2$, the two levers $d$, $d^2$ being pivoted upon the same pivot pin $d^3$ at the lower end of the quadrant $d'$ and extending at their upper ends between pairs of curved locking members $d^4$ having teeth or serrations $d^5$ in their undersides or edges. The hand lever $d$ is provided with a transverse catch $d^6$ of any suitable form operated, for example, by means of a push rod $d^7$ extending upwardly within a suitable recess in the hand lever and provided with a knob or button $d^8$ at the top for its actuation, the catch $d^6$ being preferably adapted to engage with the teeth or serrations in each of the respective pair of locking members $d^4$ at either side of the hand lever $d$. The compensating bar locking lever $d^2$ is also provided with a transverse catch $d^9$ which may be carried by an arm or pair of arms $d^{10}$ pivoted to and extending forwardly from a rearwardly projecting lug $d^{11}$ upon the locking lever $d^2$, the catch $d^9$ being adapted to engage with the teeth or serrations in the respective pair of locking members $d^4$ and being drawn upwardly into engagement therewith by means of a suitable tension spring $d^{12}$ connected between the arm $d^{10}$ and a forwardly projecting lug $d^{13}$ at the top of the locking lever $d^2$. The teeth or serrations $d^5$ and the respective catches $d^6$, $d^9$ are of such form that when engaged the locking is positive and the catches have no tendency to jump out of engagement with the teeth or serrations. The pivoted arm $d^{10}$ referred to is provided with a laterally extending ledge or flange $d^{14}$ at the side adjacent to the hand lever $d$, such ledge or flange being adapted to be engaged by the catch $d^6$ associated with the hand lever $d$ in such manner that the depression of the catch-operating rod or member $d^7$ of the hand lever $d$ serves to disengage the catches $d^6$, $d^9$ both of the hand lever $d$ and of the locking lever $d^2$ from the respective series of teeth or serrations $d^5$. It will be understood that during movement of the hand lever $d$ to operate the master cylinders $a'$, $b'$ through the compensating bar $c$, the compensating bar locking lever $d^2$ is capable of moving freely in accordance with any inequalities in pressure between the two systems $a$, $b$, so that the pressures produced in the two systems by the hand lever $d$ are exactly equal. On the release of the catch-actuating member $d^7$ of the hand lever $d$, the latter is locked in the position to which it is set, and at the same time the compensating bar locking lever $d^2$ is also locked in the position to which it has been moved during the setting of the brakes, thereby rendering the master cylinders $a'$, $b'$ immovable with respect to one another. The compensating bar $c$ is preferably provided with three semi-spherical enlargements $c'$ with which the respective levers and connecting rods pivotally engage through the intermediary of split bushes or straps $c^2$ or the like having corresponding spherical seatings.

In each system the tail skid comprises a tubular member $e^2$ slidably mounted in suitable guides under the control of shock-absorbing springs or dampers and having at its lower end a pivoted or other suitable skid for engagement with the ground. At a suitable position the tubular member $e^2$ is provided with a cam $e^3$ of semi-circular or annular form adapted, on upward axial movement of the tubular member, to effect outward relatively radial movement of the pressure-producing piston $a^8$ of the respective system, for instance $a$, through the intermediary of a roller $e^4$ or other suitable anti-friction member. The pressure-producing piston $a^8$ is disposed in a suitable cylinder $a^4$ mounted by means of an integral bracket $a^9$ or otherwise upon a suitable fixed part $k$ of the machine structure. The outwardly projecting piston rod $a^{10}$ is adapted to engage with the roller or antifriction member $e^4$ and is slidably supported in a suitable bush $a^{11}$ screwed or otherwise fitted into the open end of the cylinder $a^4$, such additional support being adapted to take up the side thrust upon the piston rod due to the action of the cam $e^3$. The head of the piston $a^8$ is provided with a suitable cup washer $a^{12}$ or other packing, and a spring $a^{13}$ is interposed between the piston $a^8$ and the end of the cylinder $a^4$ to maintain the roller $e^4$ in engagement with the cam $e^3$. The cylinder $a^4$ communicates through a suitable aperture $a^{14}$ with a transversely disposed passage or cylinder $a^{15}$ containing a pair of opposed pressure-limiting pistons $a^{16}$ normally maintained apart by means of a spring $a^{17}$ disposed between them. The pressure-limiting pistons $a^{16}$ are provided with outward extensions terminating in enlarged cup-like heads $a^{18}$ within which strong pressure-limiting springs $a^{19}$ engage the outer ends of these springs $a^{19}$ extending within and bearing against the ends of suitable caps $a^{20}$ or the like screwed or otherwise fixed to enlargements $a^{21}$ at the end of the transverse cylinder $a^{15}$, which enlargements $a^{21}$ are adapted for the slidable reception therein of the cup-like heads $a^{18}$ of the opposed pistons $a^{16}$. The transversely disposed cylinder $a^{15}$ communicates through an aperture $a^{22}$ with an outwardly extending screw-threaded boss or socket $a^{23}$ adapted for the connection of the pipe line $a$ leading to the respective master cylinder $a$. A second boss or socket $a^{24}$, also communicating with the transverse cylinder $a^{15}$ and normally closed by means of a screw-threaded plug $a^{25}$ preferably having a conical valve $a^{26}$ adapted to seat against the outer end of the communicating passage, is preferably provided for filling purposes. The opposed pistons $a^{16}$ are provided with suitable cup washers $a^{27}$ or other packings to prevent leakage. The pressure-producing device so constructed may, if necessary, be connected to the respective pipe line by means of a length of flexible piping $a^{28}$ or by other flexible coupling means to allow for relative movement between the connected parts. The pressure-limiting pistons $a^{16}$ and springs $a^{19}$ associated with the pressure-producing device may, if desired, be arranged at any other suitable position in the respective systems.

The brake shoes $f$, $f'$ of each wheel are operated to apply the brakes by a braking cylinder $a^5$ or $b^5$ respectively, preferably containing a pair of opposed pressure-exerting pistons co-operating with the extremities of suitable levers $f^2$, $f^3$ adapted at intermediate positions in their length to engage with adjustable studs or the equivalent at the free ends of the shoes, the cylinder $a^5$, $b^5$ being connected directly to the respective master cylinder $a'$, $b'$ by means of a rising pipe line $a$, $b$ and a length of flexible pipe or the equivalent being interposed at a suitable position to allow for relative movement between the wheel and the aeroplane chassis.

The pressure-adjusting cylinders $a^7$, $b^7$ of the respective systems $a$, $b$ are preferably arranged parallel with one another in a single casting mounted in a suitable position at the front or at the rear of the rudder bar $h$. The cylinders $a^7$, $b^7$ are spaced apart to permit of the passage therebetween of a rod $i'$ which extends through the cylinder casting adjacent the base of the cylinders and is provided at that extremity with a nut $i^2$ and washer $i^3$ engaging with a suitable spring $i^4$ disposed around the extending part of the rod $i'$ and tending normally to draw the rod axially in a direction towards the base or heads of the cylinders $a^7$, $b^7$.

The opposite end of the rod $i'$ is adapted for the pivotal connection of the rocker bar or lever $i$ having suitable slots $i^5$ adjacent its outer ends for engagement with radially extending pins $a^{29}$, $b^{29}$ upon the respective piston rods $a^{30}$, $b^{30}$. Each piston $a^6$, $b^6$ is provided with a cup washer $a^{31}$, $b^{31}$ or other suitable packing to ensure a fluid-tight fit in the cylinder $a^7$, $b^7$, and the piston rod $a^{30}$, $b^{30}$ may be provided in a suitable position with a circular collar or enlargement $a^{32}$, $b^{32}$ carrying a tubular sleeve $a^{33}$, $b^{33}$ adapted to fit slidably over the exterior of the cylinder $a^7$, $b^7$ to exclude dirt therefrom. Light springs $a^{34}$, $b^{34}$ may be provided between the pistons $a^6$, $b^6$ and the heads of the respective cylinders $a^7$, $b^7$ which are provided with passages $a^{35}$, $b^{35}$ communicating with screw-threaded bosses or sockets $a^{36}$, $b^{36}$ adapted for the connection of the respective pipe lines $a$, $b$ leading to the respective master cylinders $a'$, $b'$.

Each of the piston rods $a^{30}$, $b^{30}$ projects beyond the point at which it is connected to the rocker bar $i$ and at its outer end is provided with a thrust cup $a^{37}$, $b^{37}$ having a central recess of substantial depth adapted to receive and to co-operate with a push rod $h'$, $h^2$ respectively, operated from one end of a two-armed lever $h^3$ fixed to an extension $h^4$ of the rudder bar pivot, through the intermediary of a pressure-limiting spring $h^5$, $h^6$ disposed around the intermediate part $h^7$, $h^8$ of the respective push rod $h'$, $h^2$ and engaging at one end with a flange or collar $h^9$, $h^{10}$ upon the push rod adjacent the thrust cup $a^{37}$, $b^{37}$, and at the other end with a flange or collar $h^{11}$, $h^{12}$ bearing against one end of a sleeve $h^{13}$, $h^{14}$ slidably mounted upon the respective push rod and pivotally connected to the double-armed lever $h^3$ referred to. The outer extremity of the push rod is provided with a nut $h^{15}$, $h^{16}$ or the like by which the pressure-limiting spring $h^5$, $h^6$ is maintained in compression. Normally, the pressure-adjusting pistons $a^6$, $b^6$ are thrust towards the heads of the cylinders $a^7$, $b^7$ by means of the spring $i^4$ co-operating with the intermediate rod $i'$ to which the compensating bar $i$ is pivoted and the thrust cups $a^{37}$, $b^{37}$ are thereby disengaged from the respective push rods $h'$, $h^2$. This arrangement leaves the rudder bar $h$ unhampered by the braking mechanism when the latter is out of use. When, however, the hand lever $d$ before referred to is moved to take up play in the system, the pressure-adjusting pistons $a^6$, $b^6$ are forced outwards until the thrust cups $a^{37}$, $b^{37}$ engage with the respective push rods $h'$, $h^2$, whereupon the rudder bar $h$ is effective to vary the relative position of the two pistons $a^6$, $b^6$ as required for steering purposes.

When the aeroplane is in flight and about to land, the pilot sets the brakes by the hand lever $d$ until the pressure gauges $j$, $j'$ indicate a definite determinate pressure, this being sufficient to ensure that all clearance in the system is taken up and that the brake shoes $f$, $f'$ are exerting slight pressure upon the respective brake drums. The hand lever $d$ is then locked in the position to which it is set and the compensating bar locking lever $d^2$ is also locked automatically. The two braking systems $a$, $b$ are now at equal pressure and independent one of the other. When the machine lands and the tail skids $e$, $e'$ touch the ground, the engagement of the tail skid cams $e^3$ with the rollers $e^4$ at the ends of the respective piston rods forces the pressure-producing pistons of the devices $a^4$, $b^4$ in and thereby exerts pressure in the systems $a$, $b$, such pressure being restricted, however, by the pressure-limiting springs, such as $a^{19}$, which may be designed to give, for example, 600 to 680 lbs. per square inch maximum braking pressure. Means may be provided to permit of the adjustment of the pressure-limiting means to give a lesser or a greater degree of braking as desired. The operation of the brakes under the control of the tail skid obviates any tendency of the machine to overturn due to over-braking owing to the fact that as soon as the tail skid leaves the ground the brakes are immediately released.

If it is desired to steer the machine when running upon the ground, any movement of the rudder bar $h$ will cause corresponding movement of the pressure-adjusting pistons $a^6$, $b^6$ in opposite directions, thereby increasing the pressure in one system and correspondingly decreasing the pressure in the other system, this relative variation in pressure in the two systems producing a difference in the braking effect on the respective wheels $g$, $g'$ and thus effecting or assisting the steering of the aeroplane. The operation of the hand lever $d$ entails an effort, for example, of about 30 to 60 lbs. on the part of the pilot and the steering or pressure-adjusting cylinders are therefore designed so that only a relatively small additional effort, for example of about 4 or 5 lbs. is required for the operation of the rudder bar $h$.

It will be understood that the invention is not limited to the particular embodiment hereinbefore described. Any other suitable construction of pressure-producing device, pressure-controlling device, pressure-adjusting device and tail skid operating mechanism may be employed, while in place of utilizing two separate tail skids, a single skid adapted to operate a pair of independent pressure-producing devices may be utilized. Similarly, it will be understood that the invention is applicable to aeroplanes having more than two wheels symmetrically disposed on either side of the centre line of the machine, the wheels at each side of the machine having their brakes under the control of the respective system.

What we claim is:—

1. A hydraulic braking system for aeroplanes including two separate systems, a pressure producing means for each system, a master pressure controlling device in each system, a pressure adjusting device in each system, brake mechanism controlled by each system, manually operable means for simultaneously governing the master pressure controlling devices of both systems to insure uniform pressure in the respective systems, and manually operable means for controlling the pressure adjusting devices simultaneously and reversely.

2. A hydraulic braking system for aeroplanes including two separate systems, pressure producing means in each system, a master pressure controlling means in each system, a pressure adjusting means in each system, a brake controlled by each system, manually operable means for governing the pressure controlling means to compel an equal pressure in the respective systems, and a manually operable element for simultaneously controlling the pressure adjusting means of both systems, said element operating to compel relatively opposite pressure effects in the respective systems in any operation of the element.

3. A hydraulic braking system for aeroplanes including two independent systems, a pressure producing means for each system, a pressure controlling means for each system, a pressure adjusting means for each system, a manually operable element for governing the pressure controlling means of both systems to compel equal pressure in said systems, and a manually operable element connected to the pressure adjusting means of both systems and operative to simultaneously and reversely affect the pressure in the respective systems in any one movement of the element, said element being normally beyond the influence of the pressure in either system.

4. A hydraulic braking system for aeroplanes including two independent systems, each of said systems including a pressure producing means, a pressure controlling means and a pressure adjusting means, manually operable mechanism for governing the pressure controlling means of both systems simultaneously to compel an equal pressure in the respective systems, a rudder bar simultaneously and reversely affecting the pressure adjusting means of both systems, and a brake controlled by each system and responsive to the pressure in that system as governed by the pressure adjusting means.

5. A hydraulic braking system for aeroplanes including two independent systems, a pressure producing means in each system, a pressure controlling means in each system, a lever for governing the pressure controlling means for compelling an equal pressure in each system, means associated and controlled by the lever for automatically compensating for variations in pressure in the respective systems during the operation of the lever, and manually operable mechanism for selectively and reversely varying the pressure in the respective systems at will.

6. A hydraulic braking system for aeroplanes including two independent systems, an auxiliary pressure adjusting piston and a cylinder therefor included in each system, the piston of each system being normally open to the pressure in that system, a manually operable member, a connection intermediate said member and pistons to cause the member in operation to reversely operate the pistons and thereby reversely affect pressure in the respective systems, the effective connection between said member and pistons being interrupted in the absence of pressure in the systems.

7. A hydraulic braking system for aeroplanes including two sperate systems, an auxiliary pressure adjusting piston and a cylinder therefor in each system, a compensating lever connecting the auxiliary pressure adjusting pistons, a rudder bar, means intermediate the rudder bar and pistons for reversely operating the pistons in the movement of the bar, and means for normally positioning the pistons in the absence of pressure in the systems to free the rudder bar from influence on the pistons.

8. A hydraulic braking system for aeroplanes including independent pressure systems, an auxiliary pressure adjusting piston, a cylinder therefor in each system, a rocker bar connected to the respective pistons to compel relatively reverse movement thereof and corresponding pressure variation in the respective systems, a rudder bar, a connection between the rudder bar and each piston, said connection including a thrust cup, and a push rod fitting within said thrust cup and having a yielding connection with the rudder bar.

9. A hydraulic braking system for aeroplanes including independent pressure systems, an auxiliary pressure adjusting piston, a cylinder therefor in each system, a rocker bar connected to the respective pistons to compel relatively reverse movement thereof and corresponding pressure variation in the respective systems, a rudder bar, a connection between the rudder bar and each piston, said connection including a thrust cup, a push rod cooperating with each thrust cup, members carried by the rudder bar, a slidable connection between said push rods and members, and pressure limiting springs interposed between the elements of said slidable connection.

10. A hydraulic braking system for aeroplanes including independent pressure systems an auxiliary pressure adjusting piston, a cylinder therefor in each system, a rocker bar connected to the respective pistons to compel relatively reverse movement thereof and corresponding pressure variation in the respective systems, a rudder bar, a connection between the rudder bar and each piston, said connection including a thrust cup, a push rod fitting within said thrust cup and having a yielding connection with the rudder bar, and means for normally holding the thrust cups beyond the influence of the push rods in the absence of pressure in the respective systems.

EDWARD BISHOP BOUGHTON.
WILLIE EMMOTT.
DENIS TABOR BROCK.
AUSTIN CUTHBERT BURDON.